(12) United States Patent  (10) Patent No.: US 8,693,477 B2
Wang et al.  (45) Date of Patent: Apr. 8, 2014

(54) TRANSACTION AND CONNECTION INDEPENDENT PROTOCOL LOAD BALANCING

(75) Inventors: Yan-Zhe Wang, Palo Alto, CA (US); Mani Prasad Kancherla, Milpitas, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 81 days.

(21) Appl. No.: 13/296,112

(22) Filed: Nov. 14, 2011

(65) Prior Publication Data

US 2012/0057598 A1  Mar. 8, 2012

Related U.S. Application Data

(63) Continuation of application No. 12/403,130, filed on Mar. 12, 2009, now Pat. No. 8,059,653.

(51) Int. Cl.
*H04L 12/28* (2006.01)
*H04L 12/56* (2011.01)
*H04L 1/00* (2006.01)
*H04L 12/26* (2006.01)
*H04W 72/00* (2009.01)
*G06F 9/46* (2006.01)

(52) U.S. Cl.
USPC ...... 370/392; 370/237; 370/238; 370/395.32; 455/453; 718/105

(58) Field of Classification Search
USPC ............. 370/237, 238, 389, 392, 395.31, 370/395.32, 409; 455/453; 718/105
See application file for complete search history.

(56) References Cited

U.S. PATENT DOCUMENTS

| | | | |
|---|---|---|---|
| 8,059,653 B1 * | 11/2011 | Wang et al. | 370/392 |
| 2005/0108386 A1 * | 5/2005 | Acharya et al. | 709/224 |
| 2005/0175009 A1 * | 8/2005 | Bauer | 370/390 |
| 2005/0265258 A1 * | 12/2005 | Kodialam et al. | 370/254 |
| 2007/0147339 A1 * | 6/2007 | Forissier et al. | 370/351 |
| 2007/0168600 A1 * | 7/2007 | Anthony et al. | 711/108 |
| 2007/0174292 A1 * | 7/2007 | Li et al. | 707/10 |
| 2009/0047922 A1 * | 2/2009 | Buckley et al. | 455/404.1 |

FOREIGN PATENT DOCUMENTS

WO  WO 2008/052290  *  5/2008  ......... H04L 12/28

* cited by examiner

*Primary Examiner* — Ronald Abelson

(57) ABSTRACT

A system and method for load balancing session initiation protocol (SIP) traffic based on bridging and tracking transactions and connections between frontend and backend devices. The method includes receiving a SIP message and parsing a header of the SIP message. The parsing may include selecting a transaction identifier. The method further includes accessing a transaction table based on the transaction identifier and selecting a connection for forwarding the SIP message. The SIP message is then forwarded by the selected connection.

20 Claims, 10 Drawing Sheets

Flowchart 700

TRANSACTION AND CONNECTION INDEPENDENT PROTOCOL LOAD BALANCING

CROSS REFERENCE TO RELATED APPLICATIONS

This Continuation application claims the benefit of the co-pending, commonly-owned U.S. patent application Ser. No. 12/403,130, filed on Mar. 12, 2009, by Wang, et al., and titled "Transaction and Connection Independent Protocol Load Balancing", and hereby incorporated by reference in its entirety.

BACKGROUND

As the volume of internet traffic has increased rapidly, the ability to balance traffic loads over multiple computers has become increasingly important. Such balancing allows optimal resource utilization, throughput, and response time.

Traditionally, load balancing is performed based on tracking connections. The tracking of connections is suited for tracking protocols that tie the transport layer and transaction layer together. For example, with hypertext transport protocol (HTTP), a transaction is tied to the transmission control protocol (TCP) transport layer, meaning that the response transaction is transported back via the same connection the request was received on. This means that if the connection fails, the transaction will fail or die.

However, traditional load balancing techniques are not well suited for protocols which are transport layer and transaction independent. For example, with Session Initiation Protocol (SIP), multiple transactions for the same or different calls can be transported via the same TCP connection, and responses can be transmitted back through a new TCP connection if the original connection has failed. Thus, applications of traditional load balancing techniques may result in insufficient connection reuse, resulting in an imbalance over SIP servers. Further, unlike other protocols, with SIP, it is common practice for a server to initiate a new request to a client which traditional load balancing approaches do not support. The independence between transaction and transport layer of SIP makes the traditional load balancing techniques no longer feasible.

SUMMARY

Accordingly, embodiments provide a system and method of load balancing traffic for protocols that are transport and connection independent, such as, session initiation protocol (SIP). Embodiments further provide for connection reuse where possible and opening of connections when a live connection is not available. SIP traffic is thus load balanced based on tracking transactions and bridging connections between frontend and backend devices.

In one embodiment, the present invention is implemented as a method for load balancing SIP traffic. The method includes receiving a SIP message and parsing a header of the SIP message. The parsing may include selecting a transaction identifier. The method further includes accessing a transaction table based on the transaction identifier and selecting or opening a connection for forwarding the SIP message. The SIP message is then forwarded via the selected or opened connection.

In another embodiment, the present invention is implemented as a system for load balancing. The system includes a parser for extracting transaction information from a SIP message header and a load balancing module operable to select a computing or SIP device to receive a SIP message. The system further includes a memory operable to store SIP transaction information as well as connection information (e.g., frontend and backend connection information and a SIP connection proxy module operable to select a connection to the computing or SIP device.

In this manner, embodiments of the present invention load balance SIP traffic with connection reuse where possible and balance traffic over servers and connections. SIP transaction information and connections are dynamically updated and/or removed upon receiving of final response SIP communications thereby efficiently optimizing memory usage and performance.

In another embodiment, the present invention is implemented as a network device configurable to load balance SIP traffic. The network device includes a central processing unit (CPU) and a computer-readable medium having computer executable instructions stored therein that are executable by the CPU, the instructions are executable to perform load balancing of SIP traffic based on transaction information. The transaction information may be extracted from a header of a SIP message. The instructions are further operable to forward a request initiated to a SIP user agent (UA).

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
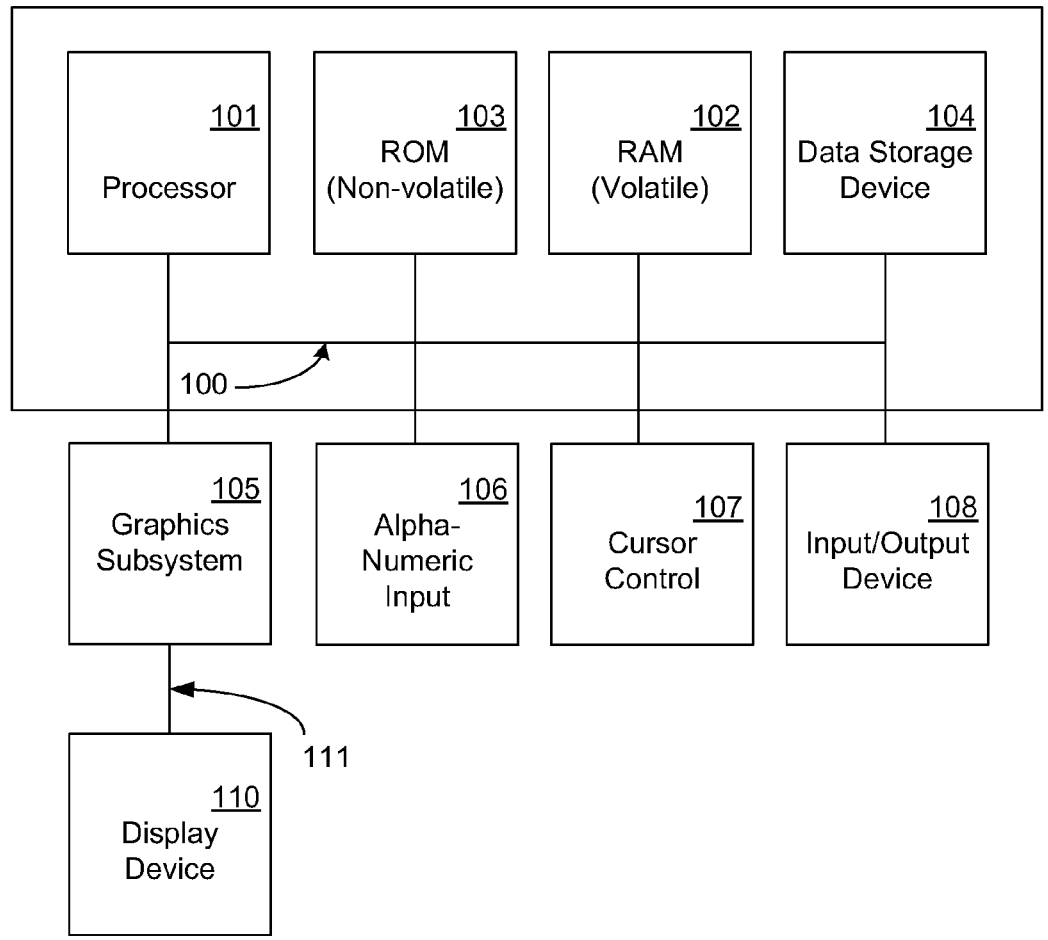
FIG. 1 is a block diagram of an exemplary computer system upon which embodiments of the present invention may be implemented.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "operating," "changing," "yielding," "assuming," "exchanging," "associating," "switching," "designating," "implementing," "attempting," "permitting," "increasing," "decreasing," "monitoring," "checking," "comparing" or the like, refer to the actions and processes of a computer system, or similar electronic computing device (e.g., a routing device such as a router or switch), that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. Examples include, but are not limited to, networking devices, routers, switches, load balancers, and application switching devices.

With reference to FIG. 1, an exemplary system for implementing embodiments includes a general purpose computing system environment, such as computing system 112. In its most basic configuration, computing system 112 typically includes at least one processing unit 101 and memory, and an address/data bus 100 (or other interface) for communicating information. Depending on the exact configuration and type of computing system environment, memory may be volatile (such as RAM 102), non-volatile (such as ROM 103, flash memory, etc.) or some combination of the two. Computer system 112 may also comprise an optional graphics subsystem 105 for presenting information to the computer user, e.g., by displaying information on an attached display device 110, connected by a video cable 111. Additionally, computing system 112 may also have additional features/functionality. For example, computing system 112 may also include additional storage (removable and/or non-removable) including, but not limited to, magnetic or optical disks or tape. Such additional storage is illustrated in FIG. 1 by data storage device 104. Computer storage media includes volatile and nonvolatile, removable and non-removable media implemented in any method or technology for storage of information such as computer readable instructions, data structures, program modules or other data. RAM 102, ROM 103, and data storage device 104 are all examples of computer storage media.

Computer system 112 also comprises an optional alphanumeric input device 106, an optional cursor control or directing device 107, e.g., a mouse, and one or more signal communication interfaces (input/output devices, e.g., a network interface card) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network).

Figure 2:
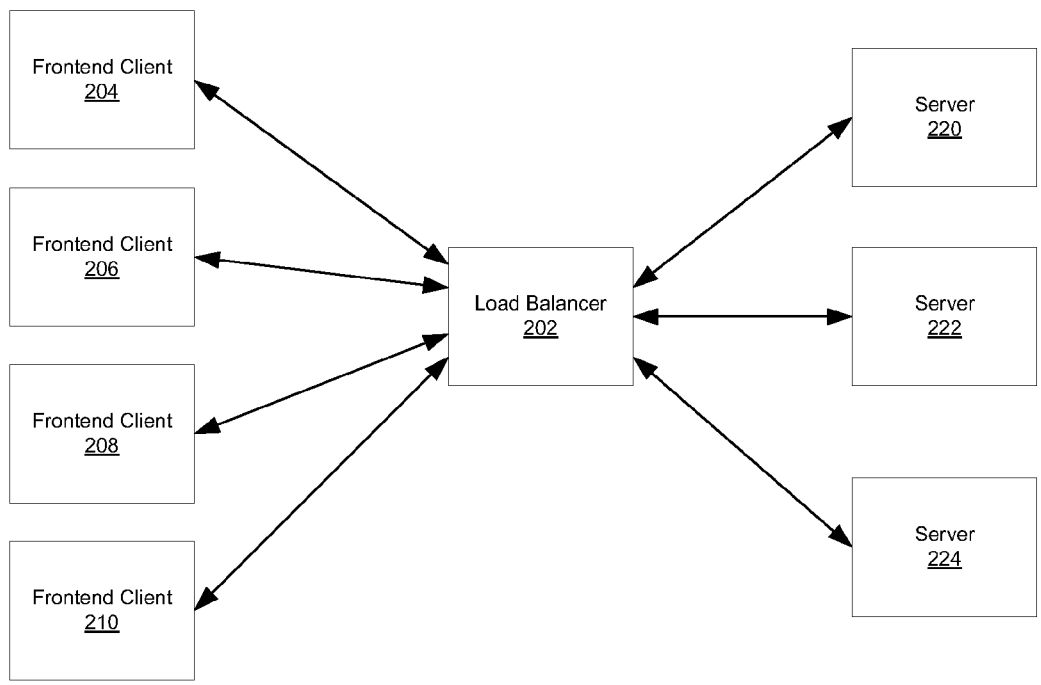
FIG. 2 is a block diagram of an exemplary operating environment in accordance with an embodiment of the present invention.

FIG. 2 is a block diagram of an exemplary operating environment in accordance with an embodiment of the present invention. Operating environment 200 includes frontend clients 204-210, servers 220-224, and load balancer 202. Frontend refers to communications occurring between clients 204-210 and load balancer 202. Backend refers to communications occurring between load balancer 202 and servers 220-224.

Frontend clients 204-210 may initiate requests to servers 220-224 via load balancer 202. Frontend client 204-210 may further receive requests from servers 220-224 via load balancer 202 and frontend clients 204-210 may respond to the requests via load balancer 202. Frontend client 204-210 may be a variety of SIP devices including, but not limited to, SIP clients, SIP Session Border Controllers, SIP user agents (UAs) or back-to-back user agents (B2BUA). Servers 220-224 may be a variety of SIP devices including, but not limited to, backend proxy servers (BEP), registrars or redirect servers.

Load balancer 202 is operable to handle session initiation protocol (SIP) communications and transactions and thereby load balance the SIP communications over servers 220-224. In one embodiment, load balancer 202 acts as a TCP connection proxy between frontend and backend transport connections. It is appreciated that embodiments may also load balance UDP as well as TCP traffic. It is further appreciated that load balancer 202 allows load balancing of transport layer and transaction layer independent communications including, but not limited to, session initiation protocol (SIP).

A SIP transaction comprises the messages from the first request sent from the client to the server or from a server to a client up to a final (non-1xx) response. Load balancer 202 tracks SIP transactions by storing information about the request and the connection that the SIP request was received on such that when the corresponding response is received, the same connection can be used to forward the response if the connection is still open. Load balancer 202 may close connections once a final response has been sent (e.g., a final response with 200 OK). This allows load balancer 202 to store a efficient amount of information. Load balancer 202 may maintain connections while middle stage responses (e.g., 100 or 180 try again) are received.

Load balancer 202 selects one of servers 220-224 based on load balancing algorithm (e.g., based on number of connections, weight assigned to each server and the like). For example, load balancer 202 may be configured to open 100 connections to each server and select a server based on available connections to the server. In one embodiment, load balancer 202 has a virtual IP which allows load balancer 202 to receive the SIP requests destined for a specific domain.

Load balancer 202 further facilitates communications between frontend clients 204-210 and servers 220-224 when a connection has been closed or failed. For example, if a request was sent from front end client 204 and was forwarded to server 220 by load balancer 202, if the connection between frontend client 204 and load balancer 202 has failed, load balancer 202 utilizes information in the response from server 220 to forward the response to frontend client 204.

Load balancer 202 supports splitting and multiplexing of SIP traffic. For example, a single TCP connection may be use to receive multiple calls or transactions and load balancer 202 may forward each call or transaction to a different server. As another example, multiple clients may participate in a call and send transactions to load balancer 202 which forwards the transactions to a specific server handling the call.

Figure 3:
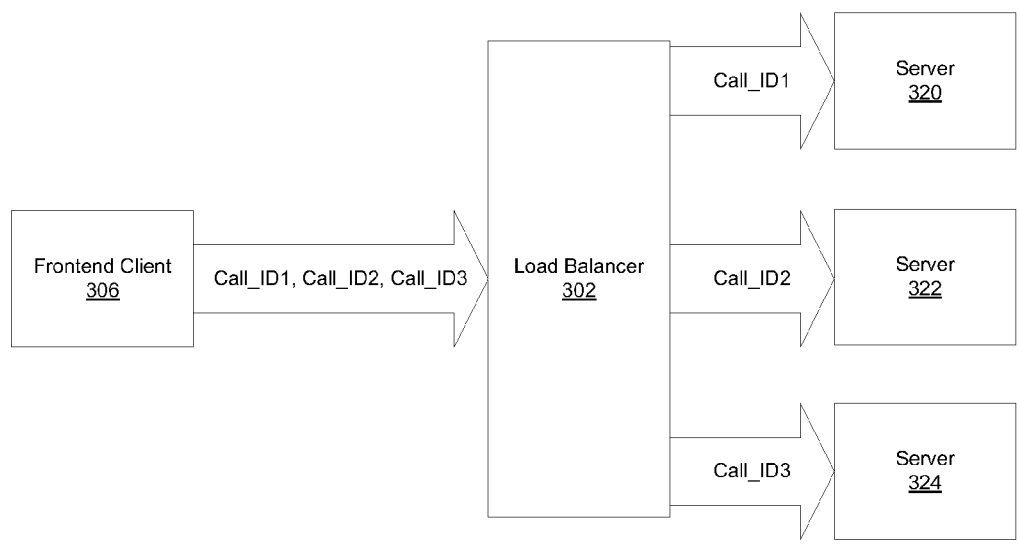
FIG. 3 is a block diagram of exemplary communications in accordance with an embodiment.

FIG. 3 is a block diagram of exemplary communications in accordance with an embodiment. Exemplary communication sequence involves communications between frontend client 306, load balancer 202, and servers 320-324. Frontend client 306 may transmit multiple SIP Calls with Call_ID1, Call_ID2, and Call_ID3, respectively, to load balancer 302. Load balancer 302 then connects to servers 320-324 and based on a load balancing algorithm and forwards Call_ID1 to server 320, Call_ID2 to server 322, and Call_ID3 to server 324 respectively. Load balancer 302 further facilitates forwarding of responses for each call from servers 320-324 to frontend client 306.

As described further herein, load balancer 302 facilitates load balanced communication between frontend client 306 and servers 320-324 when connections are closed. Load balancer 302 thereby advantageously allows the frontend client 306 and servers 320-324 to communicate without interruption when a connection is no longer alive.

Figure 4:
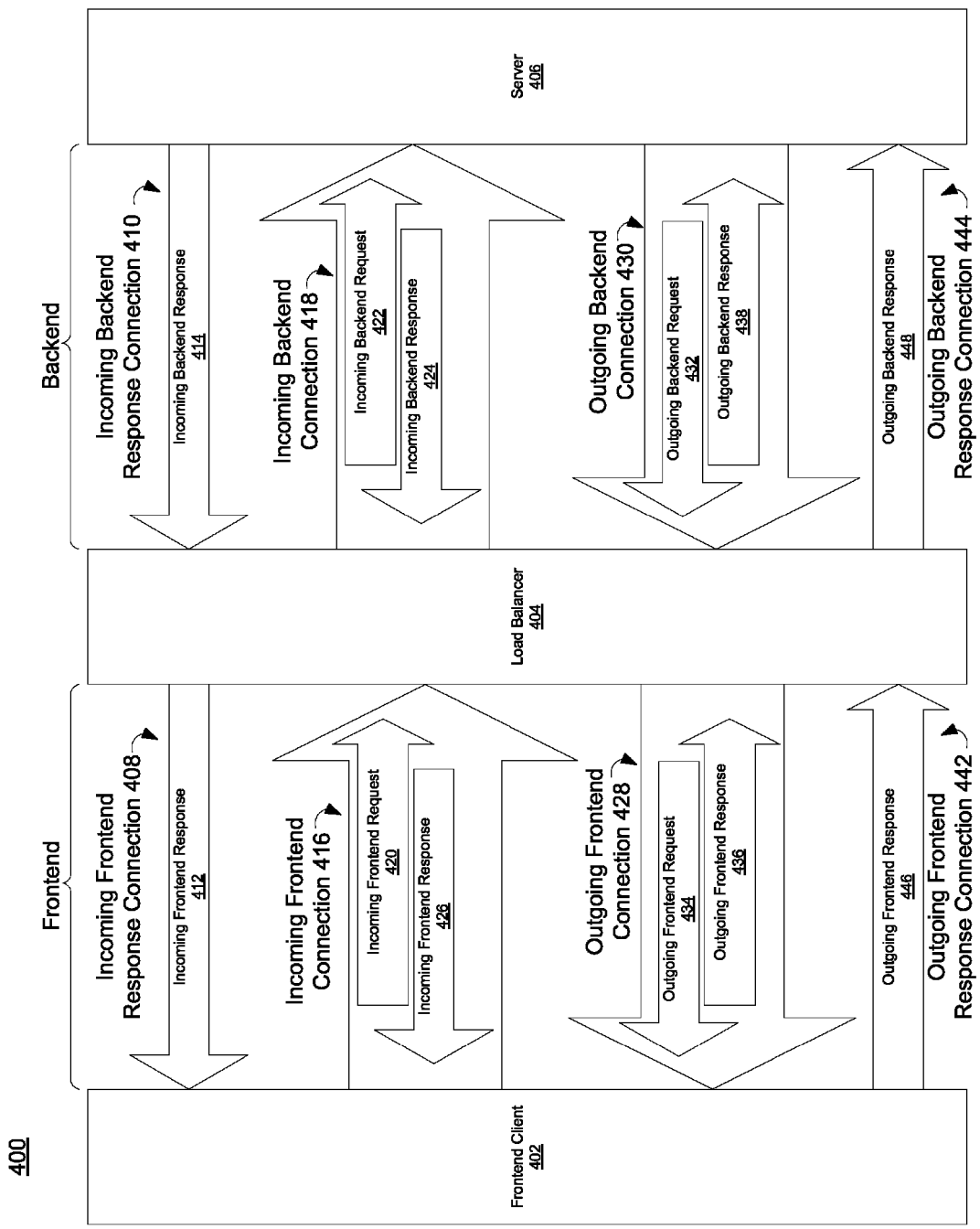
FIG. 4 is a block diagram of exemplary communications and connections in accordance with an embodiment.

FIG. 4 is a block diagram of exemplary communications and connections in accordance with an embodiment. Communications and connections diagram 400 includes frontend client 402, load balancer 404, and server 406. In one embodiment, the load balancer 404 may buffer the header of a SIP message and parse out the transaction identification information and a call-ID.

Communications initiated from a frontend client (e.g., SIP user agent) are referred to as incoming transactions. The request and response of an incoming transaction are referred to as incoming request and incoming response, respectively. A connection carrying incoming transactions is referred to as an incoming connection. Communications and connections diagram 400 further includes incoming frontend response connection 408, incoming frontend connection 416, outgoing frontend connection 428, and outgoing frontend response connection 442.

Communications initiated from a server (e.g., SIP server device including, but not limited to, a proxy, registrar, and redirect server) are referred to as outgoing transactions. The request and response of an outgoing transaction are referred to as outgoing request and outgoing response, respectively. A connection carrying outgoing transactions is referred to as an outgoing connection. Communications and connections diagram 400 further includes incoming backend response connection 410, incoming backend connect 418, outgoing backend connection 430, outgoing frontend response connection 444.

Frontend client 402 may open incoming frontend connection 416 to load balancer 404 to initiate a SIP transaction. In one embodiment, incoming frontend connection 416 is opened to a virtual IP address of load balancer 404. Load balancer 404 receives incoming frontend request 420 via incoming frontend connection 416. Load balancer 404 opens incoming backend connection 418 to server 406 to forward incoming frontend request 420 as incoming backend request 422 to server 406. Load balancer 404 may store connection information related to incoming frontend connection 416 and incoming backend connection 418 along with extracted transaction information and call ID to track the call, the transaction, and the associated connections.

While incoming backend connection 418 remains alive, server 406 will send incoming backend response 424 to load balancer 404 over incoming backend connection 418. In one embodiment, load balancer 404 will check if incoming backend response 424 is a final response. If incoming backend response 424 is a final response, load balancer 404 may close incoming backend connection 418 upon forwarding incoming backend response 424 and remove the associated transaction and connection information. Load balancer 404 may then forward incoming backend response 424 as incoming frontend response 426 over incoming frontend connection 416 to frontend client 402.

If incoming backend connection 418 has been closed or died, server 406 opens incoming backend response connection 410 to send a response to frontend client 402. Server 406 sends the response to load balancer 404 as incoming backend response 414.

It is appreciated that server 406 may attempt to connect directly to load balancer 404. In one embodiment, load balancer 404 sends a reset signal to server 406 upon server 406 trying to connect to load balancer 404 based on the "received" in the topmost VIA header of the request. The reset signal causes server 406 to open a connection directly to frontend client 402 based on the "sent-by" of the top-most VIA header. Load balancer 404 will terminate that connection and dynamically open a connection to receive the SIP message from server 406. In one embodiment, after terminating the connection load balancer 404 forwards incoming backend response 414 with the IP address of server 406 replaced with the virtual IP address of load balancer 404. Load balance 404 may also update the transaction entry and connection information with incoming backened response connection 410.

If incoming frontend connection 416 is alive, load balancer 404 uses incoming frontend connection 416 to forward incoming backend response 414 as incoming frontend response 426. If frontend connection 416 is not alive, load balancer 404 opens incoming frontend response connection 408 to forward incoming backend response 414 as incoming frontend response 412. Load balancer 404 updates the transaction and associated connection information based on incoming backend response 414 with incoming frontend response connection 408.

In a server initiated SIP communication (e.g., an incoming call for frontend client 402), server 406 opens outgoing backend connection 430 to load balancer 404 to send outgoing backend request 432. More specifically, server 406 may attempt to connect directly to frontend client 402. Load balancer 404 will terminate that connection and dynamically open a connection to receive the SIP message from server 406. In one embodiment, after terminating the connection load balancer 404 forwards outgoing backend request 432 with the IP address of server 406 replaced with the virtual IP address of load balancer 404. Load balancer 404 may also update the transaction entry and connection information with outgoing backened response connection 430. Load balancer 404 may further store session information including the call ID and socket ID so as direct responses to a specific server which initiated the call.

If there is a live connection between load balancer 404 and frontend client 402, load balancer 404 will send outgoing backend request 432 via the live connection (e.g., incoming front end connection 416) between load balancer 404 and frontend client 402. If there is not a live connection between load balancer 404 and frontened client 402, load balancer 404 opens outgoing frontend connection 428 to frontend client 402. Load balancer 404 uses outgoing frontend connection 428 to forward outgoing backend request 432 as outgoing frontend request 434. Load balancer 404 updates the corresponding transaction and connection information based on the connection used.

Frontend client 402 sends outgoing frontend response 436 via outgoing frontend connection 428 to load balancer 404. Load balancer 404 then forwards outgoing frontend response 436 as outgoing backend response 438.

If outgoing frontend connection 428 is closed or has died, frontend client 402 opens outgoing frontend response connection 442 to load balancer 404 for sending outgoing frontend response 446. More specifically, frontend client 402 may open a connection to the IP address in the "received" parameter, if present, using the port in the "sent-by" value in the topmost VIA header (e.g., the "received" parameter is the load balancer's IP address). If unsuccessful, frontend client 402 should next try to open a connection to the IP and port as indicated in "sent-by" is the server's address. In one embodiment, load balancer 404 may regard the traffic as passthrough and forward to the server. If there is a live connection to server 406, Load balancer 404 forwards the response over the live connection (e.g, outgoing backend connection 430). If there is no live connection or server 406 has not reached the maximum number of connections, load balancer 404 may open outgoing backend connection 444 and forward outgoing frontend response 446 as outgoing backend response 448. Load balancer 404 may then update the transaction and connection information.

Figure 5:
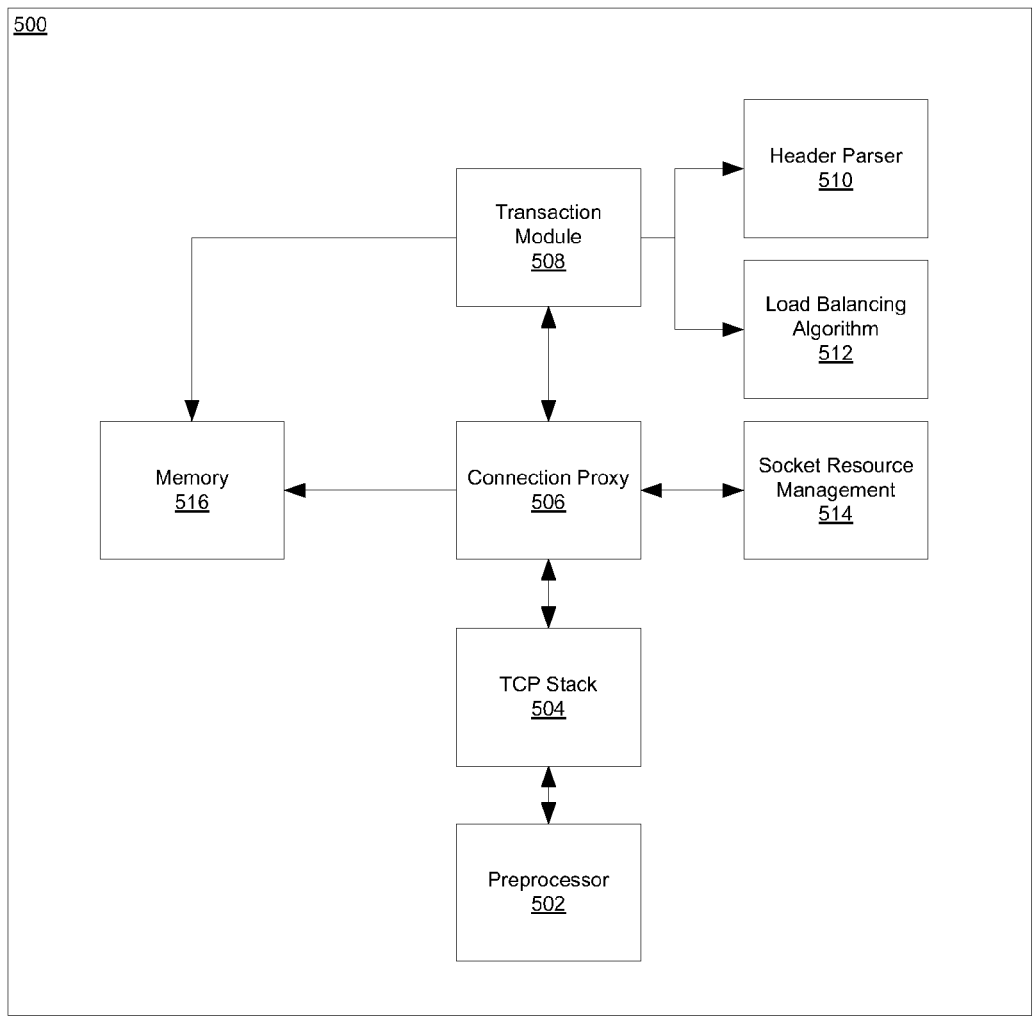
FIG. 5 is a block diagram of an exemplary system in accordance with an embodiment.

FIG. 5 is a block diagram of an exemplary system in accordance with an embodiment. System 500 includes preprocessor 502, transmission control protocol (TCP) stack 504, connection proxy 506, transaction module 508, parser 510, load balancing algorithm 512, socket resource management 514, and memory 516.

Preprocessor 502 facilitates selecting SIP traffic from traffic received. In one embodiment, preprocessor 502 facilitates the buffering of the header portion of a SIP packet. Frontend connections of system 500 may receive SIP packets via a virtual IP address. For backend connections, the traffic received could be a variety of types including, but not limited to, Hypertext Transfer Protocol (HTTP), Domain Name System (DNS), etc. For example, layer four or transport layer examination may be used to exempt traffic from being processed or deep scanned. In one embodiment, preprocessor 502 checks if traffic received is SIP traffic. If the traffic is SIP traffic, a listening socket may be dynamically opened to receive the SIP traffic.

TCP Stack 504 handles receiving and sending of TCP packets. TCP stack 504 may receive SIP traffic selected by preprocessor 502 and forward traffic processed by system 500 (e.g., load balanced).

Parser 510 extracts transaction information from a SIP message header. As described herein, parser 510 may extract information from header fields for the Call ID and transaction related fields of client IP address, client port, branch parameter, and method. The fields of client IP address, client port, branch parameter, and method may be used to uniquely identify a SIP transaction.

In one embodiment, SIP transaction manager 508 controls the parsing (e.g., via parser 510) and then passes extracted information to load balancing module 512 along with the call ID. In one embodiment, transaction module 508 stores the transaction information to memory 516 and forwards the information to load balancing algorithm 512. Transaction module 508 may further direct the Call ID information to memory 516. The transaction information and call ID may be used to ensure that subsequent communications for a SIP transaction reuse connections where possible (e.g., live connections).

Load balancing module 512 selects a computing device (e.g., SIP device) to receive a SIP message. In one embodiment, load balancing module selects a server based on the number of connections available to the server and/or traffic load on the server. The number of connections to a SIP server device may be a configurable option of system 500. Load balancing module 512 may further select a server based on the call ID. For example, for server initiated SIP traffic, returning traffic with the same call ID is directed to the server which initiated the call.

Socket resource management module 514 manages resources related to connection sockets for frontend and backend connections. Socket resource management module 514 tracks the resource usage in terms of open connections. Once the number of open connections has reached the threshold value, connections are recycled or reused more aggressively to conserve resources.

Memory 516 stores information for load balancing of SIP traffic including, but not limited to, frontend connection information, backend connection information, session information, call ID, and transaction information. In one embodiment, memory 516 comprises session information which can be used to track a SIP device that initiated a SIP transaction. For example, when a SIP server element initiates a SIP transaction, the connection opened by the SIP server element may be tracked to reuse the connection when subsequent SIP responses (e.g., from a SIP UA) are received.

In one embodiment, a backend connection table may include:

TABLE 1

Sample backend connection table

| Connection ID | Source IP | Source Port | Destination IP | Destination Port | Bound frontend connection | State |
|---|---|---|---|---|---|---|

Where: Connection ID is the index of the connection.
Source IP is the source IP address of the connection.
Destination IP is the destination IP address of the connection.
Source Port is the source port of the connection.
Destination Port is the destination port of the connection.
Bound frontend connection is the bound frontend connection, if this field is set, packets received from this frontend connection should be forwarded to the bound backend connection only. This may be used when a SIP message has arbitrary long content.
State is the state of the connection.

In one embodiment, a frontend connection table may include:

TABLE 2

Exemplary frontend connection table

| Connection ID | Source IP | Source Port | Destination IP | Destination Port | Bound backend connection | State |
|---|---|---|---|---|---|---|

In one embodiment, the fields of a frontend connection table are substantially similar to those in backend connection table, with the "Bound frontend Connection" field replaced with "Bound backend Connection."

In one embodiment, memory 516 further includes a SIP transaction table including:

TABLE 3

Sample transaction entry table

| Client IP* | Client Port | Branch ID* | method* | From-connection | To-connection | Timer |
|---|---|---|---|---|---|---|

Where: Client IP is the client IP address as indicated in topmost VIA header's "sent-by" of the request message.
Client Port is the client source port as indicated in topmost VIA header's "sent-by" (if exists) of the request message.
Branch ID is the branch parameter in the topmost VIA header field of the request message.
Method is the method of the request.
From-connection is the frontend connection ID (e.g., from the frontend connection table).
To-connection is the backend connection ID (e.g., from the backend connection table).
Timer is the refresh value which in one embodiment is three minutes.

In one embodiment, the client IP, client port, branch ID, and method are used as a key to uniquely identify a transaction. The SIP transaction table may be updated and maintained by transaction module 508.

For example, a SIP transaction entry created on receiving the first SIP request that starts a transaction, the client IP, client port, branch ID, and method are extracted from the message (e.g., by parser 510). The "from-connection" field will be populated with the connection the request was received on. When a response is received by system 500 (e.g., by load balancer 404), parser 510 extracts the client IP, client port, branch ID, and method which are used to match with an alive "from-connection". If the connection is live, the "from-connection" is used to forward the response. Otherwise, a new connection is located and the "from-connection" field is updated. If the response is a final response, the "timer" field of the transaction entry is set to wait-for-delete. If the response is non-final, the timer is refreshed.

SIP connection proxy module 506 is operable to select a connection to a SIP device. More specifically, SIP connection proxy 506 accepts, opens, closes connections based on memory 516. SIP connection proxy 506 further updates and maintains memory 516 based on the accepting, opening, and closing of connections as SIP traffic is received.

FIGS. 6-10 are flowcharts 600, 700, 800, 900, and 1000, respectively, of examples of computer-implemented methods (e.g., executed by a CPU operating on instructions retrieved from a storage medium such as a memory) for load balancing in one embodiment in accordance with the present invention. Although specific steps are disclosed in the flowcharts, such steps are exemplary. That is, embodiments in accordance with the present invention are well-suited to performing various other steps or variations of the steps recited in the flowcharts. The steps in the flowcharts may be performed in an order different than presented.

Figure 6:
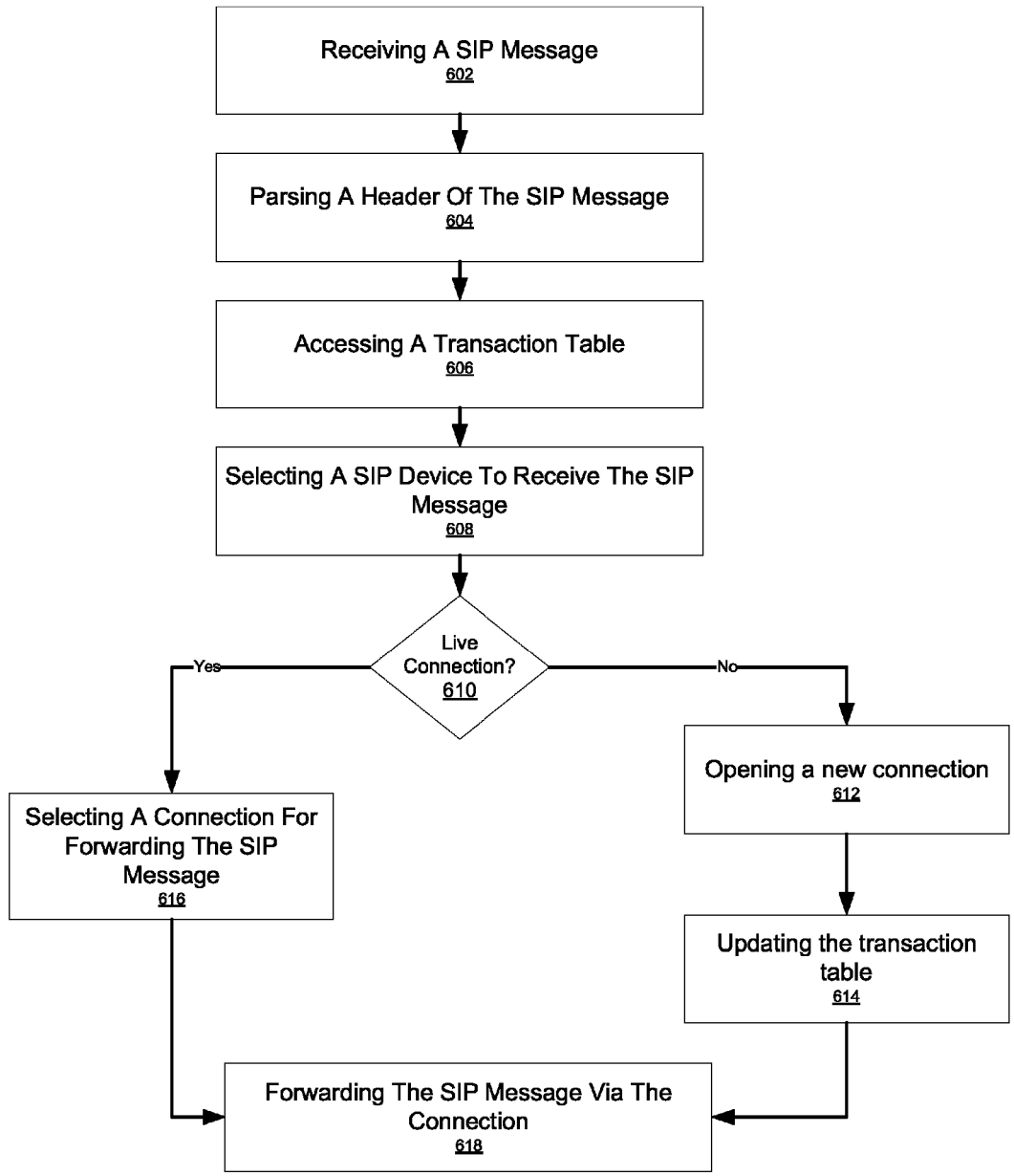
FIG. 6 is a flowchart of an exemplary method for load balancing in accordance with an embodiment.

FIG. 6 is a flowchart of an exemplary method for load balancing in accordance with an embodiment. The blocks of flowchart 600 may be carried out by a SIP load balancing device communicating with SIP UAs, SIP server devices, or other SIP devices.

In block 602, a SIP message is received. In one embodiment, the message is buffered up to the end of the header.

In block 604, a header of the SIP message is parsed. In one embodiment, the parsing comprises selecting a transaction identifier which includes an IP address, port, branch parameter, and a method from the SIP header.

In block 606, a transaction table is accessed based on the transaction identifier. If the SIP message is a request of a new transaction, the information parsed out is stored (e.g., in a transaction table entry) for tracking subsequent communications (e.g., a response). If the SIP message corresponds to a transaction table entry, the transaction information is accessed for determining a connection to forward the SIP message, as described herein. If the response is final, the accessing of the transaction table may include marking a transaction table entry for deletion thereby allowing embodiments to maintain a dynamic and efficient transaction table. If the response is non-final, the transaction table entry timer may be refreshed.

In block 608, a SIP device is selected to receive the SIP message. For SIP messages initiating a SIP transaction to a SIP device may be selected based on a load balancing algorithm. For SIP messages of existing transactions, the SIP device may be selected based on a call identifier (call ID) and corresponding transaction table entry.

In block 610, a check for a live connection is performed. In one embodiment, the connections in the transaction table fields of from-connection or to-connection checked to see if the connection is alive. For example, the corresponding status and/or state fields of the frontend or backend connection tables are checked. If the corresponding connection is not live, block 612 is performed. If the corresponding connection is live, block 616 is performed.

In block 612, a connection is dynamically opened for forwarding the SIP message. If the SIP message is part of a new transaction or the corresponding connection is not alive, a new connection is opened. For a SIP message of a new transaction, the new connection may be opened based on a load balancing algorithm as described herein. In block 614, the transaction table is updated with the dynamically opened connection information.

In block 616, a connection for forwarding the SIP message is selected. The connection may be selected based on the transaction table entry of an existing transaction and/or the corresponding connections in the frontend connection or backend connection tables. In block 618, the SIP message is forwarded via the connection.

Figure 7:
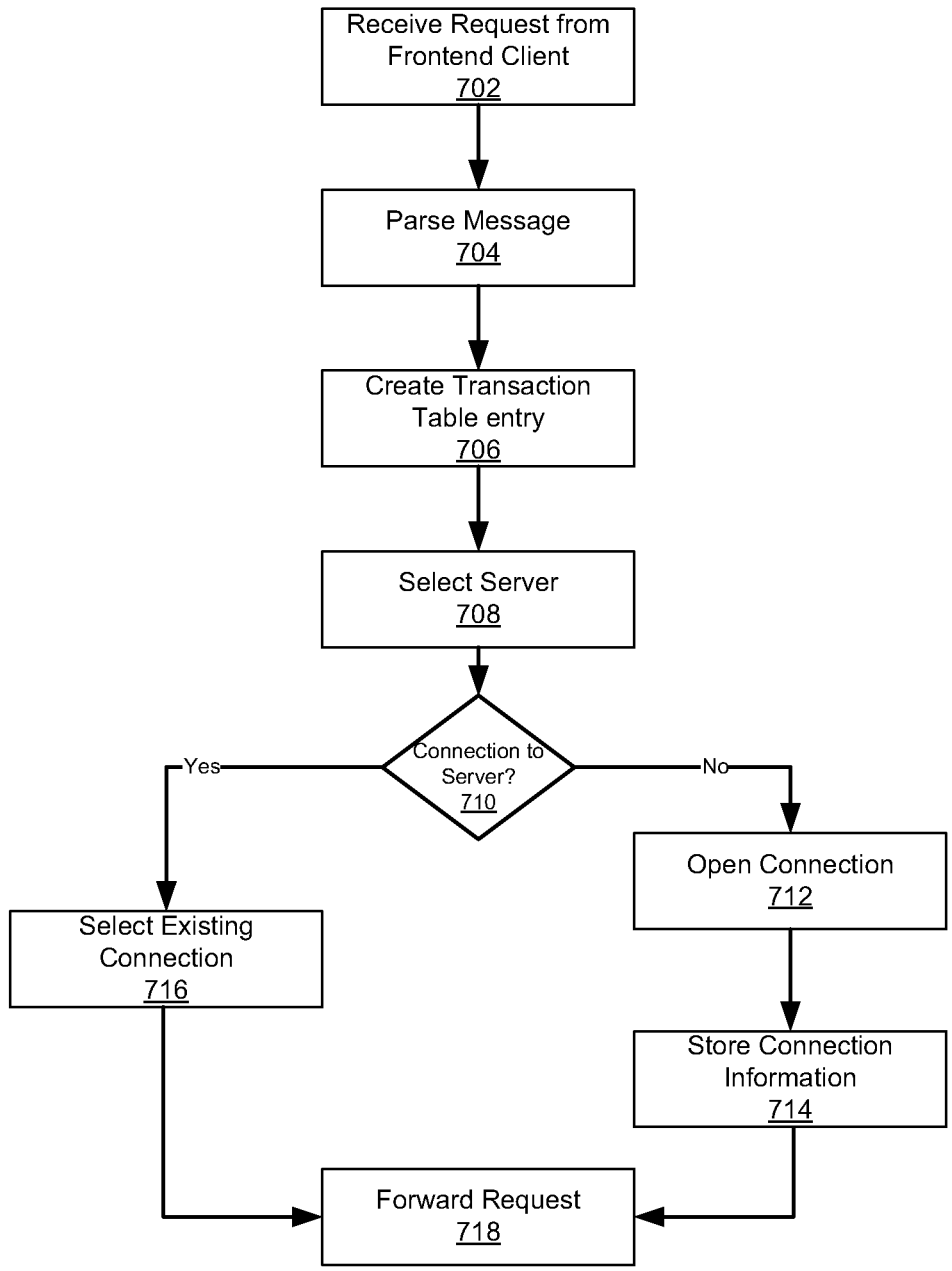
FIG. 7 is a flowchart of an exemplary method for incoming request processing in accordance with an embodiment.

FIG. 7 is a flowchart of an exemplary method for incoming request processing in accordance with an embodiment. In one embodiment, flowchart 700 depicts the receiving and processing of a request from a frontend computing device (e.g., frontend client 202) and forwarding the request to a backend computing device (e.g., server 220). It is appreciated that while flowchart 700 discusses session initiation protocol (SIP) communication, embodiments of the present invention are operable to handle communication of any transport and transaction independent protocol.

In block 702, a request is received from a frontend client. In one embodiment, the request is a SIP transaction and is received via a virtual IP address. In one embodiment, the packets are buffered up to the SIP header end for parsing.

In block 704, the message is parsed. In one embodiment, the extracted fields based on the parsing include: Call-ID and transaction related header fields: IP address and port from "sent-by" of the topmost VIA header, branch parameter from the topmost VIA header, and the method from the request header. Embodiments may use the IP address, branch parameter, and method to uniquely identify a transaction. The call-ID may be used as a load balancing persistency parameter (e.g., to select and determine which SIP device should receive a call).

In block 706, a transaction table entry is created. The transaction table entry is created based on the extracted transaction related header fields (e.g., client IP address, port, branch parameter, and method). In one embodiment, the "from-connection" field of the transaction entry is filled with the incoming frontend connection's ID and the "to-connection" field is filled with the incoming backend connection's ID.

In block 708, a server is selected. If the call-ID is new, server selection may be based on the load balancing algorithm (e.g., performed by load balancing module 512). An entry in a session table may be accessed to use the call-ID to select a server. For example, if there is an entry with a matching Call-ID, the server in the entry is selected.

In block 710, whether there is a connection to the server is checked. If there is no connection to the selected server or if the number of connections to the server is below the configured number (e.g., below the maximum number of connections), block 712 is performed. If there is an existing connection, block is 716 is performed.

In block 712, a connection is opened to the selected server. If the maximum number of connections has not been reached or there is no connection, a new connection is opened.

In block 714, the connection information is stored. In one embodiment, the connection information is added to a backend connection table (e.g., of memory 516) and transaction table entry.

In block 716, an existing connection is selected. If there is already a connection open to a server for the call-ID and the corresponding transaction table entry, the connection is selected. If the connection is overloaded then any open connection may be selected. If the maximum number of connections has been reached then one of the least used connections is selected.

In block 718, the request is forwarded to the server. The selected connection or opened connection is used to forward the request. Subsequent packets of the same message, buffered or not buffered, up to the content-length may be forwarded to the selected server. In one embodiment, the incoming frontend connection is used to forward the data until the content has been forwarded to the destination and the incoming frontend connection is not bound to any other incoming backend connection during the forwarding of the traffic.

Figure 8:
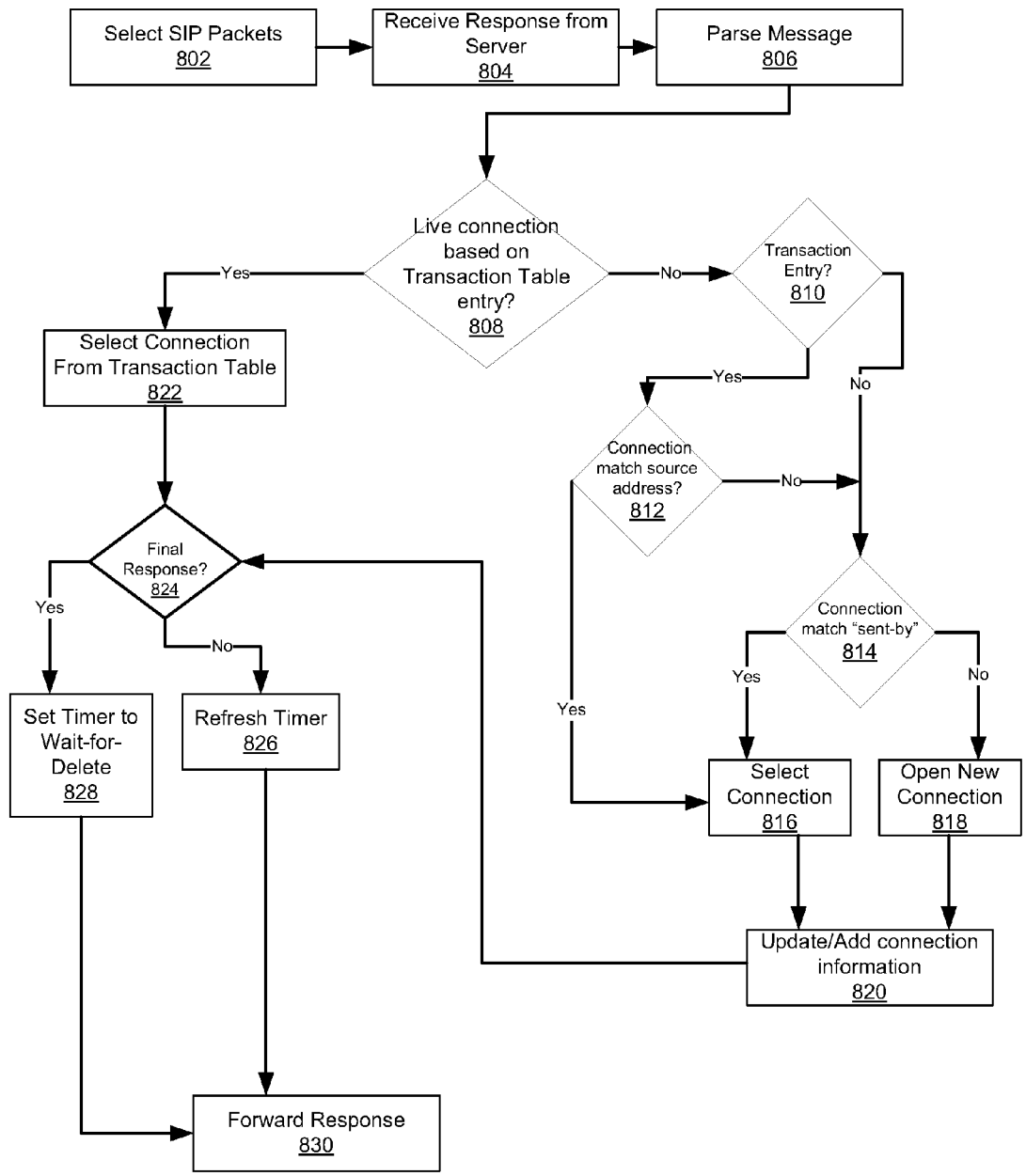
FIG. 8 is a flowchart of an exemplary method for incoming response processing in accordance with an embodiment.

FIG. 8 is a flowchart of an exemplary method for incoming response processing in accordance with an embodiment. In one embodiment, flowchart 800 depicts the receiving and processing of a response from a server computing device (e.g., server 220) and forwarding of the response to a frontend computing device (e.g., frontend client 204).

In block 802, SIP packets are selected. In one embodiment, non SIP (e.g., DNS, HTTP, FTP, etc.) packets are filtered out. In one embodiment, the scanning is based on layer four or transport information. For example, if the destination IP address and/or port is HTTP then the packet is passed through. The internal buffering of packets may be substantially similar to incoming request processing (e.g., SIP header buffering).

In block 804, a response is received from a server. The response received may be a SIP transaction response from a server in response to a request from a frontend client.

In block 806, the message is parsed. In one embodiment, the extracted fields include, call-ID and transaction related header fields: IP address and port from the "sent-by" field of the topmost VIA header, branch parameter from the topmost VIA header, and the method from the Cseq (content sequence number) header.

In block 808, whether a live connection is available based on a transaction table entry is checked. The transaction parameters extracted are matched to the transaction entry to locate a connection based on the response message sharing the same transaction information key field as the request. If there is a matching transaction table entry and the corresponding connection is alive, block 822 is performed. Otherwise, if there is not a matching transaction entry or the connection in the transaction table entry is closed, block 810 is performed.

In block 810, whether there is a transaction entry is checked. If there is a transaction table entry, block 812 is performed. If a matching transaction entry is not found in the transaction table, block 814 is performed.

In block 812, the frontend connection table is searched for a match with the source address of the client (e.g., a connection to the same client that was closed). If there is a match, block 816 is performed. If there is not a match, block 814 is performed.

In block 814, the frontend connection table is searched for a connection with either the same source address or destination address as the address extracted from "sent-by" in the current topmost VIA header. If a connection is found, block 816 is performed. If a connection is not found, block 818 is performed. In block 816, the connection found is selected.

In block 818, a new connection is opened to the frontend client. In one embodiment, the new connection is opened to the address extracted from the "sent-by" field in the current topmost VIA header.

In block 820, the connection information in the transaction table is updated or added. If there is a transaction entry corresponding to the response, the from-connection field of the transaction entry is updated with the connection determined from the frontend connection table. If a new connection was opened, the connection is added to the frontend connection table.

In block 822, the live connection from the transaction entry table is selected.

In block 824, whether a response is a final response is checked. For example, the final response may be a non-1xx response sent from the server to a client. If the response is a final response, block 828 is performed. If the response is not final, block 826 is performed.

In block 826, the timer is refreshed. In one embodiment, the timer value is refreshed to three minutes.

In block 828, the transaction table entry timer field is set as wait-for-delete. The setting of a transaction table entry time to wait-for-delete facilitates maintaining of a small dynamic transaction table entry thereby conserving resources and improving performance. In block 830, the packet is forwarded to the frontend client via the selected connection.

Figure 9:
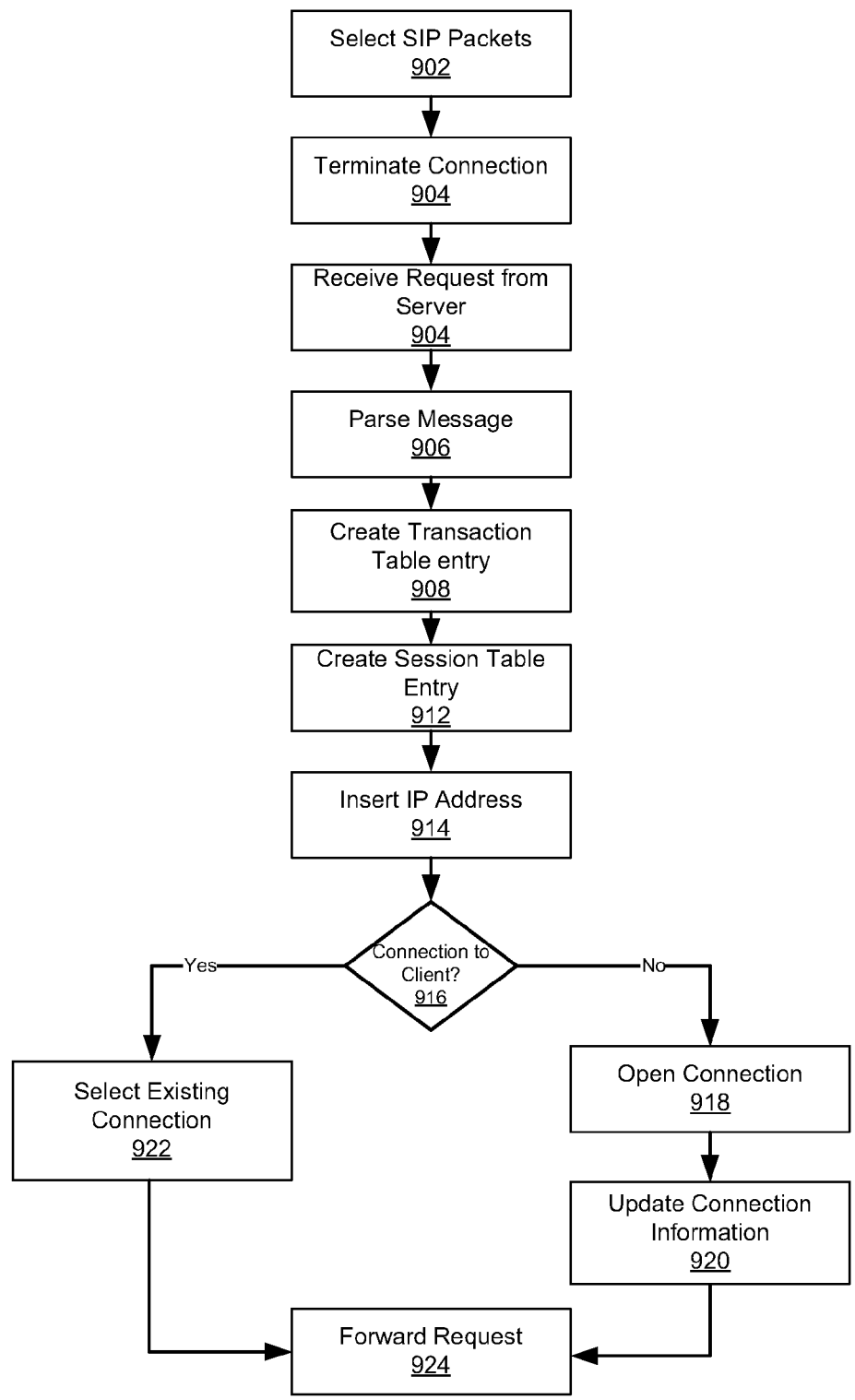
FIG. 9 is a flowchart of an exemplary method for outgoing request processing in accordance with an embodiment.

FIG. 9 is a flowchart of an exemplary method for outgoing request processing in accordance with an embodiment. In one embodiment, flowchart 900 depicts the receiving and processing of a request from a server computing device (e.g., server 220) and forwarding of the request to a frontend computing device (e.g., frontend client 204). A SIP request from a server to a client may include, but is not limited to, a call going to a client device.

In block 902, SIP packets are selected. In one embodiment, non SIP (e.g., DNS, HTTP, FTP, etc.) packets are filtered out. In one embodiment, the scanning is based on layer four or transport information. For example, if the destination IP address and/or port is HTTP then the packet is passed through.

In block 904, the connection from the server to a frontend client is terminated. In one embodiment, termination may involve looking at a packet to determine if a server is connecting with a client and dynamically open a listening socket to receive the packet.

In block 906, based on the SIP packets received, a request is received from a server. The internal buffering of packets may be substantially similar to incoming request processing (e.g., SIP header buffering). Internal buffering may further be used if the request is spread across multiple packets.

In block 908, the SIP message is parsed. In one embodiment, the extracted fields based on the parsing include, call-ID, and transaction related header fields: IP address and port from "sent-by" of the topmost VIA header, branch parameter from the topmost VIA header, and the method from the request header. Embodiments may use the IP address, port, branch parameter, and method to uniquely identify a transaction. The call-ID may be used as a load balancing persistency parameter.

In block 910, a transaction table entry is created. The transaction table entry is created based on the extracted transaction related header fields (e.g., client IP address, port, branch parameter, and method). The transaction entry is created based on extracted transaction parameters and the from-connection field of the entry is set to the connection from the server.

In block 912, a session table entry is created. The session table entry is created based on the call-ID to link the call-ID to the server from which the call originated. If there is already a session table entry for the call-ID, a new session entry need not be created. The session table facilitates the subsequent messages relating to the stored call-ID to be forwarded to the server. In one embodiment, the session table includes the socket ID for the connection from that server to a load balancer (e.g., load balancer 404). For example, if the server is a B2BUA, subsequent SIP transactions of the same call initiated from a client are forwarded to the server which initiated the SIP transaction.

In block 914, the address of the load balancer is inserted. In one embodiment, the IP address of a server is replaced with the virtual IP address of the load balancer (e.g., load balancer 404).

In block 916, whether there is a connection to the client is checked. A search on the frontend connection table for a connection with a destination address of the from-connection (e.g., a frontend client's IP address) is performed to find a connection. If there is an alive connection to the client, block 922 is performed. If an alive connection can not be found, block 918 is performed.

In block 918, a connection is opened to the client. In block 920, connection information is updated. The newly opened connection is added to the frontend connection table. The to-connection field of the corresponding transaction entry is updated with the newly opened connection.

In block 922, an existing connection is selected. The connection found in the frontend connection table with a destination matching the from-connection may be used. In block 920, the request from the server is forwarded to the client.

Figure 10:
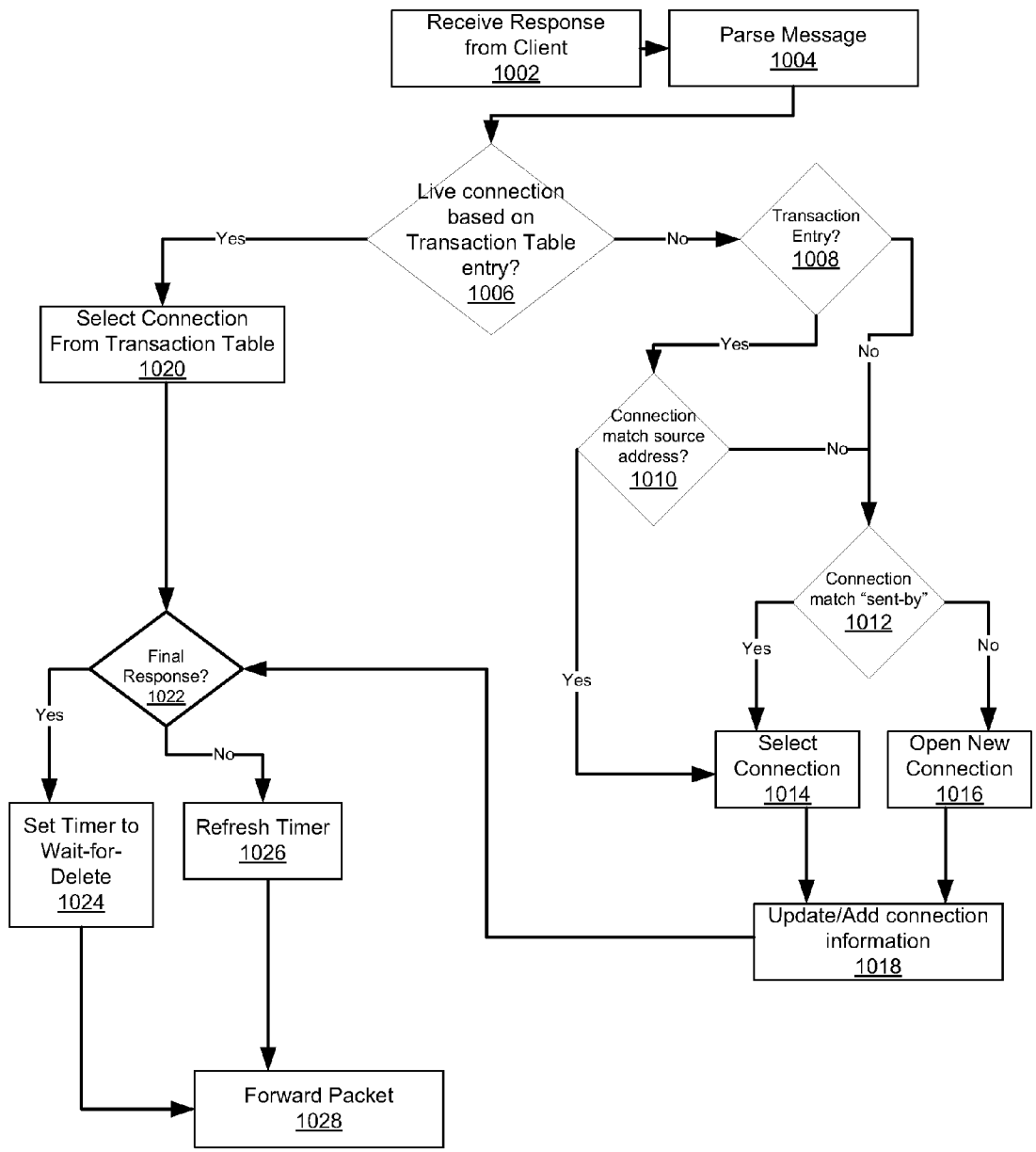
FIG. 10 is a flowchart of an exemplary method for outgoing response processing in accordance with an embodiment.

FIG. 10 is a flowchart of an exemplary method for outgoing response processing in accordance with an embodiment. In one embodiment, flowchart 1000 depicts the receiving and processing of a response from a client computing device (e.g., frontend client 204) and forwarding of the request to a server computing device (e.g., server 220).

In block 1002, a response is received from a frontend client. The response from the frontend client may be a response to a request from a server sent by an outgoing connection.

In block 1004, the message is parsed. In one embodiment, the extracted fields include, call-ID, and transaction related header fields: IP address and port from "sent-by" of the topmost VIA header, branch parameter from the topmost VIA header, and the method from the Cseq header.

In block 1006, whether a live connection based on transaction table entry is available is checked. The transaction parameters extracted are matched to a transaction table entry to locate a connection based on the response message sharing the same transaction information key field as the request. If there is a matching transaction table and the corresponding connection is alive, block 1020 is performed. Otherwise, if there is not a matching transaction entry or the connection in the transaction table is closed, block 1008 is performed.

In block 1008, whether there is a transaction entry is checked. If there is a transaction table entry, block 1010 is performed. If a matching transaction entry is not found in the transaction table, block 1012 is performed.

In block 1010, the backend connection table is searched for a match with the source address of the server (e.g., a connection to the same server that was closed). If there is a match, block 1014 is performed. If there is not a match, block 1012 is performed.

In block 1012, the backend connection table is searched for a connection with either the same source address or destination address as the address extracted from the "sent-by" field in the current topmost VIA header. If a connection is found, block 1014 is performed. If a connection is not found, block 1016 is performed.

In block 1014, the connection found is selected. In block 1016, a new connection is opened to the server. In one embodiment, the new connection is opened to the address extracted from the "sent-by" field in the current topmost VIA header.

In block 1018, the connection information in the transaction table is updated or added. If there was a transaction entry corresponding to the response, the from-connection field of the transaction entry is updated with the connection determined from the backend connection table. If a new connection was opened, the connection is added to the backend connection table. In block 1020, the live connection from the transaction entry table is selected.

In block 1022, whether a response is a final response is checked. For example, if the request is INVITE and the final response is non-2xx, the transaction also includes an ACK to the response. If the response is a final response, block 1024 is performed. If the response is not final, block 1026 is performed.

In block 1024, the timer is refreshed. In one embodiment, the timer value is refreshed to three minutes.

In block 1026, the transaction table entry timer field is set as wait-for-delete. The setting of transaction table entry time field to wait-for-delete facilitates maintaining of a small dynamic transaction table entry thereby conserving resources and improving performance. In block 1028, the packet is forwarded to the frontend client via the selected connection.

According to embodiments of the present invention, SIP traffic is load balanced with connection reuse where possible and balanced over servers and connections. SIP transaction information is utilized to dynamically track and bridge connections between SIP devices. Embodiments further establish new connections when the original connection has failed based on transaction information. SIP transaction information and connections are dynamically updated and may be removed upon receiving of final response SIP communications thereby optimizing memory usage and performance.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of load balancing session initiation protocol (SIP) traffic, comprising:
   receiving a SIP message;
   parsing a header of said SIP message, wherein said parsing comprises selecting a transaction identifier;
   accessing a transaction table based on said transaction identifier, wherein said transaction table is stored in a memory comprising a frontend connection table for communications occurring between a plurality of clients and a load balancer and a backend connection table for communications occurring between a load balancer and a plurality of servers;
   selecting a connection for forwarding said SIP message; and
   forwarding said SIP message via said connection, wherein said forwarding is operable to comprise forwarding said SIP message based on said backend connection table.

2. The method as described in claim 1 further comprising:
   selecting a SIP device to receive said SIP message, wherein said SIP device selection is based on a load balancing algorithm.

3. The method as described in claim 2 wherein said selecting of said SIP device is based on a call identifier (call ID).

4. The method as described in claim 1 further comprising:
   opening a connection dynamically for forwarding said SIP message.

5. The method as described in claim 4 further comprising:
   updating said transaction table with said dynamically opened connection.

6. The method as described in claim 1 wherein said accessing of said transaction table comprises creating a transaction table entry with said transaction identifier.

7. The method as described in claim 1 wherein said accessing of said transaction table comprises marking a transaction table entry for deletion.

8. The method as described in claim 6 wherein said transaction identifier comprises an internet protocol (IP) address, a port, a branch parameter, and a method from a SIP message header.

9. The method as described in claim 8 wherein branch parameter is from a topmost VIA header.

10. The method as described in claim 9 wherein said IP address and said port are from a "sent-by" field of said topmost VIA header.

11. The method as described in claim 1 wherein said selecting comprises searching a frontend connection table.

12. The method as described in claim 1 wherein said selecting comprises searching a backend connection table.

13. A tangible computer-readable medium having stored thereon, computer-executable instructions that, if executed by a computing device, cause the computing device to perform a method comprising:
   receiving a SIP message;
   parsing a header of said SIP message, wherein said parsing comprises selecting a transaction identifier;
   accessing a transaction table based on said transaction identifier, wherein said transaction table is stored in a memory comprising a frontend connection table for communications occurring between a plurality of clients and a load balancer and a backend connection table for communications occurring between a load balancer and a plurality of servers;

selecting a connection for forwarding said SIP message; and forwarding said SIP message via said connection, wherein said forwarding is operable to comprise forwarding said SIP message based on said backend connection table.

14. The tangible computer-readable medium as described in claim 13 wherein said method further comprises:

opening a connection dynamically for forwarding said SIP message.

15. The tangible computer-readable medium as described in claim 14 wherein said method further comprises:

updating said transaction table with said dynamically opened connection.

16. The tangible computer-readable medium as described in claim 13 wherein said method further comprises:

selecting a SIP device to receive said SIP message, wherein said SIP device selection is based on a load balancing algorithm.

17. A method for sending session initiation protocol (SIP) traffic comprising:

receiving a SIP message;

parsing a header of said SIP message, wherein said parsing comprises selecting a transaction identifier;

accessing at least one of a frontend connection table for communications occurring between a plurality of clients and a load balancer and a backend connection table for communications occurring between a load balancer and a plurality of servers based on said transaction identifier;

selecting a connection for forwarding said SIP message; and forwarding said SIP message via said connection, wherein said forwarding is operable to comprise forwarding said SIP message based on at least one of said frontend connection table and said backend connection table.

18. The method of claim 17 further comprising:

opening a new connection for forwarding said SIP message.

19. The method of claim 18 further comprising:

adding said new connection to said frontend connection table.

20. The method of claim 17 further comprising:

determining whether said SIP message is a final response.

* * * * *